(No Model.) 2 Sheets—Sheet 1.

H. KELLOGG.
FOLDING REEL FOR HARVESTING MACHINES.

No. 366,114. Patented July 5, 1887.

Witnesses
Geo. W. Breck
Geo. Wadman

Inventor
Henry Kellogg
By his Attorney
Gifford & Brown (No Model.) 2 Sheets—Sheet 2.

H. KELLOGG.
FOLDING REEL FOR HARVESTING MACHINES.

No. 366,114. Patented July 5, 1887.

Witnesses
Geo. W. Breck
Geo. Wadman

Inventor
Henry Kellogg
By his Attorneys
Gifford & Brown

UNITED STATES PATENT OFFICE.

HENRY KELLOGG, OF NEW HAVEN, CONNECTICUT.

FOLDING REEL FOR HARVESTING-MACHINES.

SPECIFICATION forming part of Letters Patent No. 366,114, dated July 5, 1887.

Application filed April 14, 1887. Serial No. 233,579. (No model.)

*To all whom it may concern:*

Be it known that I, HENRY KELLOGG, a citizen of the United States, residing at New Haven, county of New Haven, in the State of Connecticut, have invented a new and useful Improvement in Folding Reels for Harvesting-Machines, of which the following is a specification, reference being had to the accompanying drawings.

The object of my invention is to secure a reel which shall be capable of expansion and contraction to meet the requirements of different heights of grain to be cut, and which shall also be capable of being folded into a small compass when not in use and during transportation and storage.

A further object of my invention is to secure a reel which shall be capable of expansion and contraction by the expenditure of a smaller amount of force than has heretofore been necessary in reels of this class.

My improved reel may be employed in different types of harvesting-machines.

Figure 1:
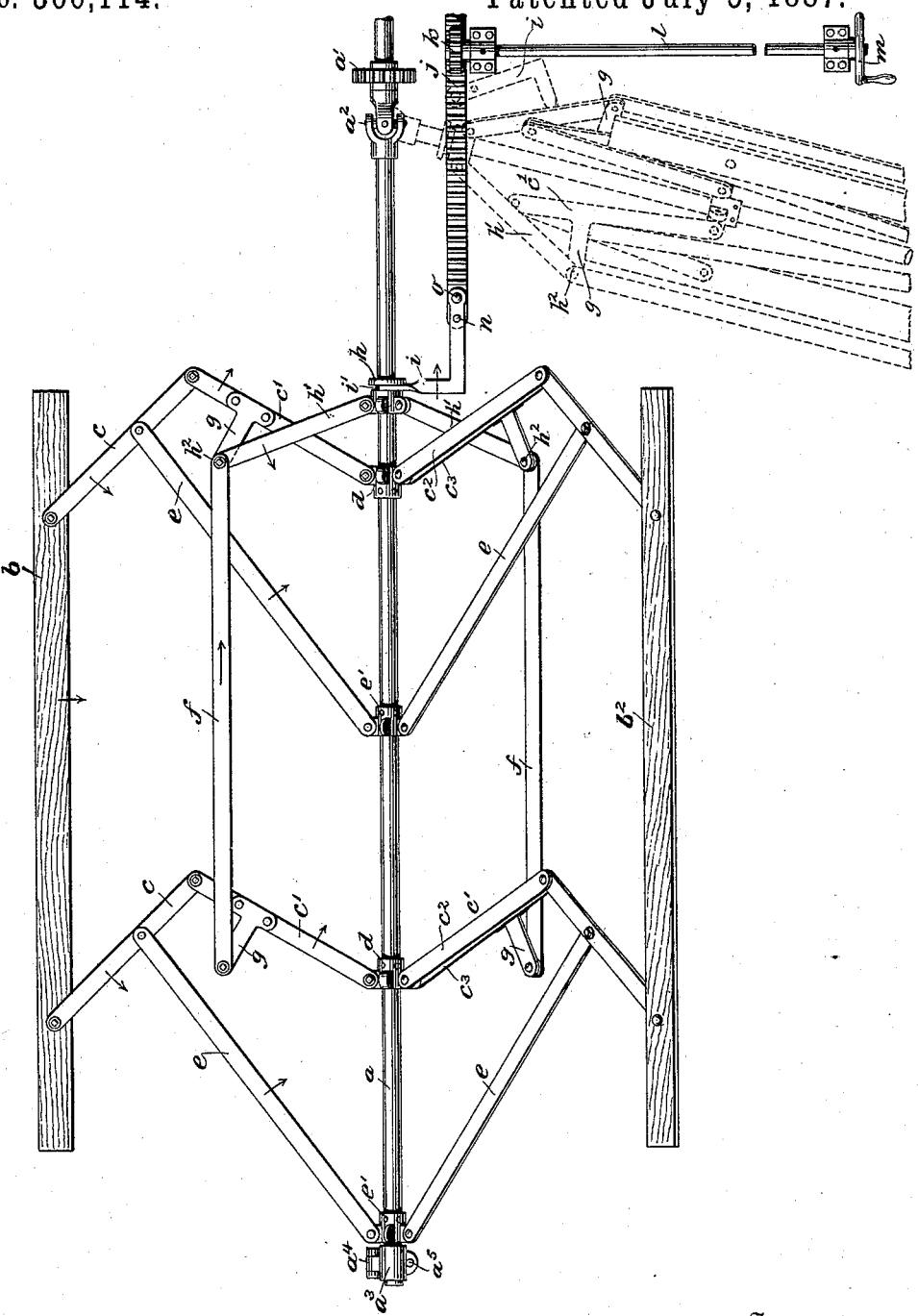
Figure 2:
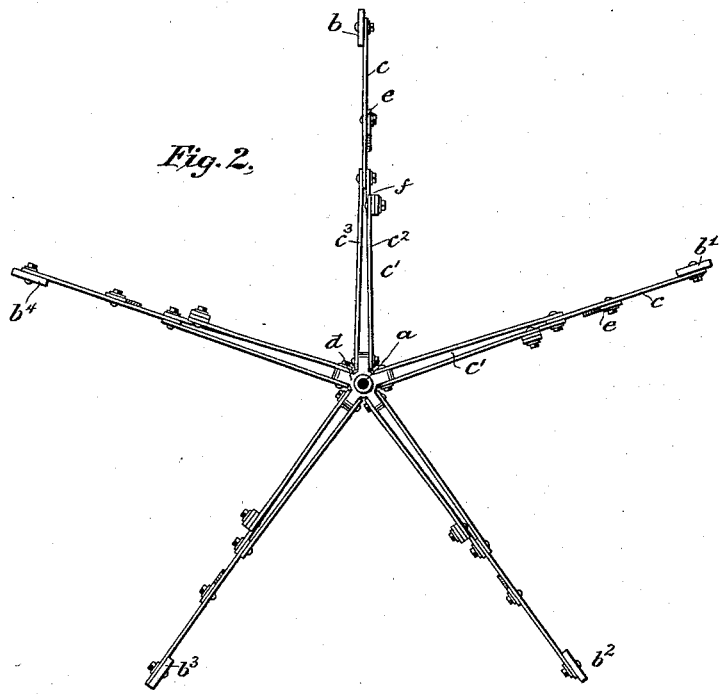
Figure 3:
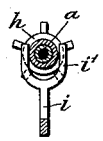

In the drawings, Figure 1 represents a reel constructed according to my invention, expanded to nearly its full extent. The upper part of the figure represents a plan view of one of the beaters and its connecting parts. The lower part of the figure represents an isometric view of one of the beaters and its connecting parts, while at the right of the figure is shown, in dotted lines, a representation of the reel in its folded condition. Fig. 2 represents an end view of my improved reel. Fig. 3 represents the fork connecting the folding mechanism with the rack and pinion.

$a$ is the reel-shaft, which is revolved by the spur-wheel $a'$ by means of a worm or any other suitable means. At $a^2$ the reel-shaft is provided with a universal joint, and at its other or outer end has its bearings in a piece, $a^3$, the upper portion of which is hinged at $a^4$, so as to be capable of being thrown back, to permit of the reel-shaft being taken out of its bearing to be swung out of the way on the universal joint at $a^2$.

$a^5$ is a pin, which secures the two parts of the piece $a^3$ when the reel-shaft is in operation.

I have shown in the drawings, Fig. 2, five beaters, $b$, $b'$, $b^2$, $b^3$, and $b^4$, but do not mean to confine myself to a reel employing that exact number, as a greater or less number may be usefully employed. The means for operating any one of these beaters to open it, adjust it, or fold it up completely is the same as is used for all, and therefore a description of one will suffice, it being here stated that all the beaters are operated for all purposes simultaneously.

I will describe the beater $b$ and its operating parts. The beater consists of a strip of wood, and it is connected to the reel-shaft by a pair of jointed arms pivoted to the beater—one near each end. Each one of these jointed arms is made up of two members, $c$ and $c'$, which are of equal length. The member $c'$ is composed of two parts, $c^2$ and $c^3$, as shown in Fig. 2 and in the lower beater, $b^2$, of Fig. 1.

As is shown in Fig. 2, the member $c'$ of each pair of jointed arms is connected with a piece, $d$, of which there are two. Each of these pieces is rigidly secured to the shaft $a$, as shown in Fig. 1, and has five lugs or projections such as are shown in connection with the piece in Fig. 2, and to these lugs the parts $c^2$ and $c^3$ of the jointed arms are pivoted. This method of connecting the jointed arm with the shaft secures strength in its inner member, and as the outer member is pivoted between the parts of the inner member it also affords a pocket for a portion of the outer member to lie in when folded, thus economizing space. To the outer member of each jointed arm is pivoted a strip, $e$, at a point about one-third of the entire distance of the beater from the reel-shaft when fully expanded. I have found in practice that by pivoting the strip $e$ at about the point named the reel may be folded in a smaller compass than have reels of this class heretofore. I have found that in a reel of seven feet possible expansion, by locating the strips $e$ at the point shown in the drawings, the beaters will not, while being expanded or contracted, move out of line endwise more than from two and a half to three inches, and that when closed the beaters will project beyond the point they occupied when fully open little if any. Each of the strips $e$ is connected at its inner end with the reel-shaft by means of a piece, $e'$, rigidly secured to the reel-shaft. These pieces $e'$ are, in their general form, similar to the pieces $d$, having five lugs upon their surface, to which the strips for each beater are respectively connected.

While I prefer to use two strips $e$ for each beater, one only may be used and good results will follow.

$f$ is a strip or stretcher connecting the lower members of the pairs of jointed arms of each beater. In the drawings I have shown this stretcher $f$ connecting the lower members of each set of jointed arms by being pivoted at a short distance from said members on a short stud, $g$, mounted thereon. However, it would answer all practical purposes if the stretcher connected the jointed arms by being mounted directly on them or by being mounted on a stud, $g$, at one end only; or the stretcher might connect the two upper members, although I do not recommend this latter. The real function of the stretcher $f$ being to maintain the same relative distance between the jointed arms, and to secure their simultaneous operation, the place and manner of mounting them can be varied considerably.

$g$ is a short stud or arm mounted on the inner member of each set of jointed arms. To one of these studs $g$ is pivoted at $h^2$ a strip, as $h'$, for each beater. This strip $h'$ is pivoted to a sliding sleeve, $h$, on the reel-shaft, which sleeve has five lugs—one for each strip $h'$. The power to open and close the reel is applied to the sliding sleeve $h$ on the reel-shaft, to which motion is communicated through the medium of the forked piece $i$, which enters a groove cut in the sliding sleeve. The forked piece $i$ receives its motion through a rack, $j$, which is caused to reciprocate through the hand-wheel (for the operator) $m$, shaft $l$, and pinion $k$. By thus providing a pivot-point for the strip $h'$ at a short distance from the joint, I am enabled to secure a quicker and easier opening or folding of the reel, because, as will be seen in the dotted portion of Fig. 1, where the reel is shown closed, it will require much less force to raise the part $c'$ when the moving force is pivoted at $h^2$ than if it were exerted in a direct or nearly direct line with the piece $c'$. Suppose the reel to be in the partially-expanded position shown in Fig. 1, and it is desired to fold it completely, then the hand-wheel $m$ will be turned in a proper direction to cause the rack $j$, fork $i$, and sliding piece $h$ to move in the direction of the arrow across the face of the fork $i$ in Fig. 1. This will cause the piece $h'$ to move in the direction of the arrow across its face, and the other parts will each move respectively in the direction of the arrow across its face. Should it be desired to swing the reel as thus folded to the position shown in dotted lines, Fig. 1, or any other desired position, the pin $a^5$ may be taken out of the part $a^3$ and the top of that part swung back on its hinge $a^4$. The pin $n$ may be taken out of the forked piece $i$ and that piece swung out of the way on its pivot $o$, when the reel may be lifted out of the piece $a^3$ and swung into any desired position. Of course where more or less than five beaters are employed the parts may be altered to correspond, and still retain the features of my invention.

What I claim as my invention, and desire to secure by Letters Patent, is—

1. In a folding reel for harvesting-machines, the combination, with a revolving shaft, of beaters, two pairs of jointed arms connecting each beater with the shaft, a strip, $e$, for each beater, pivoted at one end to the outer member of its pair of arms and at the other end to the shaft, a link, $h'$, connecting the inner member of each pair of jointed arms adjacent to the driver's seat with a reciprocating piece, and a stretcher connecting the inner members of the two pairs of jointed arms connecting each beater with the shaft, substantially as set forth.

2. In a folding reel for harvesting-machines, the combination, with a revolving shaft, of beaters, two pairs of jointed arms connecting each beater with the shaft, a strip, $e$, for each beater, pivoted at one end to the outer member of its pair of arms and at the other end to the shaft, a stud, $g$, mounted on the inner member of each pair of jointed arms adjacent to the driver's seat, a link, $h'$, pivoted at one end to each stud and connecting the same with a reciprocating piece, and a stretcher connecting the inner members of the two pairs of jointed arms connecting each beater with the shaft, substantially as set forth.

HENRY KELLOGG.

Witnesses:
D. H. DRISCOLL,
CHAS. T. WARD.